United States Patent
Im et al.

(10) Patent No.: US 9,612,473 B2
(45) Date of Patent: Apr. 4, 2017

(54) DISPLAY DEVICE COMPRISING A WAVELENGTH-SELECTIVE TRANSFLECTIVE MEMBER HAVING AN OPENING AND OVERLAPPING AT LEAST TWO OF A PLURALITY OF COLOR FILTERS

(71) Applicant: Samsung Display Co., Ltd., Yongin (KR)

(72) Inventors: Hyundeok Im, Seoul (KR); Oleg Prudnikov, Suwon-si (KR); TaeWoo Kim, Seoul (KR); Moongyu Lee, Suwon-si (KR); Byoungho Cheong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 561 days.

(21) Appl. No.: 13/771,665

(22) Filed: Feb. 20, 2013

(65) Prior Publication Data

US 2014/0085567 A1    Mar. 27, 2014

(30) Foreign Application Priority Data

Sep. 27, 2012    (KR) .................. 10-2012-0108085

(51) Int. Cl.
*G02F 1/1335*    (2006.01)
*G02F 1/1362*    (2006.01)

(52) U.S. Cl.
CPC .. *G02F 1/133555* (2013.01); *G02F 1/133514* (2013.01); *G02F 2001/133521* (2013.01); *G02F 2001/136222* (2013.01)

(58) Field of Classification Search
CPC ... G02F 2001/133521; G02F 1/133555; G02F 2001/136222
USPC ........................................................ 349/105
See application file for complete search history.

(56) References Cited

U.S. PATENT DOCUMENTS

| | | | |
|---|---|---|---|
| 5,930,011 A | * | 7/1999 | Gambogi, Jr. ......... G02B 5/203 349/105 |
| 2005/0174512 A1 | * | 8/2005 | Roh .................. G02F 1/133514 349/106 |
| 2008/0174716 A1 | | 7/2008 | Chen et al. |
| 2011/0116010 A1 | | 5/2011 | Nagata et al. |
| 2011/0216269 A1 | | 9/2011 | Kobayashi et al. |
| 2012/0147296 A1 | * | 6/2012 | Montgomery et al. ......... 349/70 |

FOREIGN PATENT DOCUMENTS

| | | |
|---|---|---|
| JP | 2001-124918 | 5/2001 |
| JP | 2010-250259 | 11/2010 |
| KR | 10-0869276 | 11/2008 |
| KR | 10-2010-0077969 | 7/2010 |
| KR | 10-2011-0035460 | 4/2011 |
| KR | 10-2011-0072712 | 6/2011 |

* cited by examiner

*Primary Examiner* — Paul Lee
(74) *Attorney, Agent, or Firm* — H.C. Park & Associates, PLC (57) ABSTRACT

A display device includes a display panel and a backlight unit. The display panel is configured to display an image. The backlight unit is configured to provide light to the display panel. The display panel includes an array substrate including a plurality of pixel areas, an opposite substrate facing the array substrate, a liquid crystal layer disposed between the array substrate and the opposite substrate, and a wavelength-selective transflective member disposed on the array substrate or the opposite substrate.

20 Claims, 6 Drawing Sheets

DISPLAY DEVICE COMPRISING A WAVELENGTH-SELECTIVE TRANSFLECTIVE MEMBER HAVING AN OPENING AND OVERLAPPING AT LEAST TWO OF A PLURALITY OF COLOR FILTERS

CROSS-REFERENCE TO RELATED APPLICATION

This application claims priority from and the benefit of Korean Patent Application No. 10-2012-0108085, filed on Sep. 27, 2012, which is incorporated by reference for all purposes as if set forth herein.

BACKGROUND

Field

The present disclosure relates to a display device. More particularly, the present disclosure relates to a display device configured to improve light efficiency and display quality.

Discussion

In general, various display devices, e.g., a liquid crystal display device, an electrophoretic display device, an electrowetting display device, etc., utilize a separate light source, e.g., a backlight unit, and, as such, are typically referred to as non-self-emissive display devices. Non-self-emissive display devices are configured to display images using light radiating from the backlight unit, the light propagating through one or more color filters. In this manner, the color filters transmit light of a specific wavelength (or range of wavelengths) and absorb light of other wavelength(s). Accordingly, such display devices do not use light absorbed by the color filters to display images, and thus, light efficiency of such display devices is decreased.

Therefore, there is a need for an approach that provides cost-effective techniques to efficiently utilize light radiating from a backlight unit and, thereby, increase display quality.

The above information disclosed in this Background section is only for enhancement of understanding of the background of the invention and, therefore, it may contain information that does not form any part of the prior art nor what the prior art may suggest to a person of ordinary skill in the art.

SUMMARY

Exemplary embodiments provide display devices configured to improve light efficiency and display quality.

Additional aspects will be set forth in the detailed description which follows and, in part, will be apparent from the disclosure, or may be learned by practice of the invention.

According to exemplary embodiments, a display device includes: a display panel configured to display an image; and a backlight unit configured to provide light to the display panel. The display panel includes an array substrate including a plurality of pixel areas, an opposite substrate facing the array substrate, a liquid crystal layer disposed between the array is substrate and the opposite substrate, and a wavelength-selective transflective member disposed on the array substrate or the opposite substrate.

According to exemplary embodiments, a display device includes: a display panel configured to display an image; and a backlight unit configured to provide light to the display panel. The display panel includes an array substrate including a plurality of pixel areas, an opposite substrate facing the array substrate, a liquid crystal layer disposed between the array substrate and the opposite substrate, and a wavelength-selective transflective member including a plurality of sub-wavelength selective transflective members, the wavelength-selective transflective member being disposed on the array substrate or the opposite substrate and being configured to transmit light of different wavelengths.

According to exemplary embodiments, a display panel includes: a wavelength-selective transflective member configured to transmit light of at least one first range of wavelengths and reflect light of at least one second range of wavelengths; and a plurality of color filters disposed on the wavelength-selective transflective member, wherein the wavelength-selective transflective member includes an aperture disposed in association with one of the plurality of color filters.

According to exemplary embodiments, the display device and/or display panel includes the wavelength-selective transflective member to increase the amount of light made incident on the color filters. Thus, a light efficiency and a display quality of the display device and/or display panel may be improved.

The foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers and/or regions may be exaggerated for clarity and descriptive purposes. Also, like reference numerals denote like elements.

When an element or layer is referred to as being "on," "connected to," or "coupled to" another element or layer, it may be directly on, directly connected to, or directly coupled to the other element or layer, or intervening elements or layers may be present. When, however, an element is referred to as being "directly on," "directly connected to," or "directly coupled to" another element or layer, there are no intervening elements or layers present. For the purposes of this disclosure, "at least one of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by the use of these terms. These terms are only used to distinguish one element, component, region, layer, or section from another element, component, region, layer, or section. Thus, a first element, component, region, layer, or section that is discussed below could be termed a second, third, etc., element, component, region, layer, or section without departing from the teachings of the present invention.

Spatially relative terms, such as "beneath," "below," "lower," "above," "upper," and the like, may be used herein for descriptive purposes and, thereby, to describe one element or feature's relationship to another element(s) or feature(s) as illustrated in the drawings. It will be understood that the spatially relative terms are intended to encompass different orientations of an apparatus in use and/or operation in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations) and, as such, the spatially relative descriptors used herein are to be interpreted accordingly.

The terminology used herein is for the purpose of describing particular embodiments only and is not intended to be limiting. As used herein, the singular forms, "a," "an," and "the" are intended to include the plural forms as well, unless the context clearly indicates otherwise. Moreover, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the is accompanying drawings.

Figure 1:
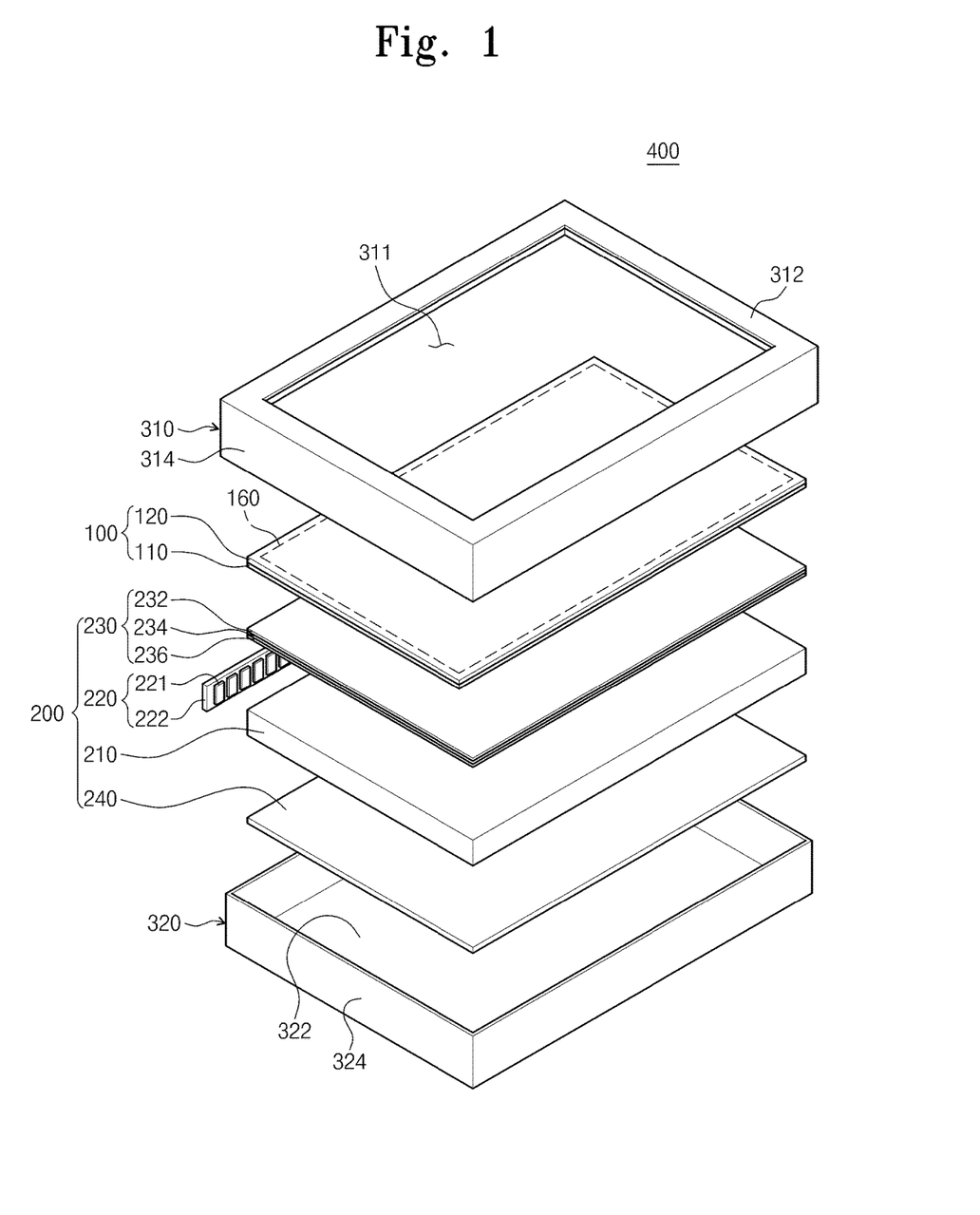
FIG. 1 is an exploded perspective view of display device, according to exemplary embodiments.
Figure 2:
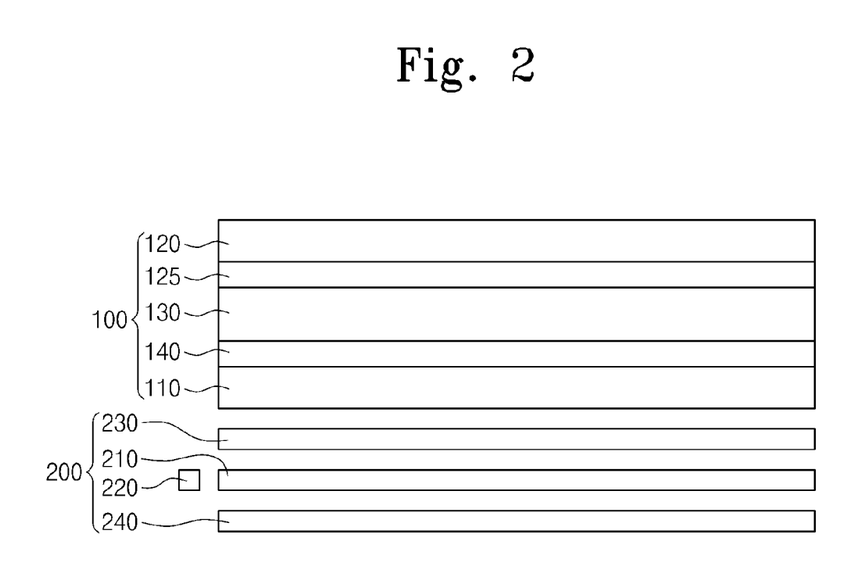
FIG. 2 is a cross-sectional view of a display panel and a backlight unit of the display device of FIG. 1, according to exemplary embodiments.

FIG. 1 is an exploded perspective view of a display device, according to exemplary embodiments. FIG. 2 is a cross-sectional view of a display panel and a backlight unit of the display device of FIG. 1.

Referring to FIGS. 1 and 2, a display device (or apparatus) 400 includes a display panel 100, a backlight unit 200, an upper cover 310, and a lower cover 320. While specific reference will be made to this particular implementation, it is also contemplated that display device 400 may embody many forms and include multiple and/or alternative components. For example, it is contemplated that the components of display device 400 may be combined, located in separate structures, and/or separate locations.

The display panel 100 may include (or otherwise implement) various display panel technologies, such as various self-emissive and/or non-self-emissive display panel technologies. For instance, self-emissive display panels may include organic light emitting display (OLED) panels, plasma display panels (PDP), etc., whereas non-self-emissive display panels may constitute liquid crystal display (LCD) panels, electrophoretic display (EPD) panels, electrowetting display (EWD) panels, and/or the like. According to the illustrated exemplary embodiment, display panel 100 is an LCD panel 100.

The display panel 100 may be geometrically configured to include, for example, a rectangular display surface with first (e.g., long) sides and second (e.g., short) sides. The display panel 100 may be configured to display an image through a display area 160. In addition, the display panel 100 includes an array substrate 110, an opposite substrate 120 facing the array substrate 110, and a liquid crystal layer 130 disposed between the array substrate 110 and the opposite substrate 120.

Although not shown in figures, the display panel 100 may further include one or more polarizing plates respectively disposed on either of its outer surfaces, e.g., an outer surface of the array substrate 110, and an outer surface of the opposite substrate 120.

According to exemplary embodiments, the array substrate 110 includes a plurality of pixels (not shown) arranged in, for example, a matrix form (or configuration). For instance, the plurality of pixels may be uniformly positioned and, thereby, spaced in one or more row and column formations. It is contemplated, however, that the spatial positioning and/or spacing between pixels may be varied or randomly disposed.

While not depicted, individual pixels may include a plurality of sub-pixels having different colors from each other. For instance, each sub-pixel may have a red, green, blue color, or other color. Thus, light exiting from each sub-pixel may exhibit one of the red, green, blue, or other colors. In addition, each pixel may include (or be electrically connected to) a gate line (not shown), a data line (not shown) insulated from the gate line and configured to cross the gate line, and a pixel electrode (not shown). Further, each pixel may include a thin film transistor (not shown) electrically connected to the gate line, the data line, and the pixel electrode. The thin film transistor is configured to switch a driving signal applied to the pixel electrode.

The array substrate 110 may also include a driver integrated circuit (IC) disposed (e.g., mounted, formed, etc.) thereon. The driver IC is supplied various control signals from a source (e.g., an external source (not shown)) and, thereby, configured to apply a driving signal to the thin film transistor of the display panel 100 in response to the various control signals.

The opposite substrate 120 includes a color filter layer 125 that realizes a predetermined color using light radiating from the backlight unit 200, and a common electrode (not shown) disposed on the color filter layer 125 to face the pixel electrode (not illustrate). Accordingly to exemplary embodiments, the color filter layer 125 includes a plurality of color filters each having one color of red, green, or blue and being formed via any suitable manufacturing processes, e.g., via one or more deposition and/or coating processes. It is contemplated, however, that ones of the plurality of color filters may be of any suitable color and, as such, are not limited to red, green, and blue colors. While, in the illustrated exemplary embodiment, the color filter layer 125 is disposed on the opposite substrate 120, it should not be limited thereto or thereby. That is, the color filter layer 125 may be disposed on the array substrate 110.

The liquid crystal layer 130 includes liquid crystal molecules arranged in a specific direction in response to an electric field generated by voltages respectively applied to the pixel electrode and the common electrode, and thus, the liquid crystal layer 130 may be configured to control a transmittance of light propagating through the liquid crystal layer 130, and thereby, facilitating the display of desired images.

In exemplary embodiments, a wavelength-selective transflective member 140 is disposed on an inner surface of the array substrate 110 or the opposite substrate 120, i.e., one of surfaces facing each other of the array substrate 110 and the opposite substrate 120. For instance, the wavelength-selective transflective member 140 is disposed on the surface of the array substrate 110 that faces (e.g., is the closest to) the opposite substrate 120.

The wavelength-selective transflective member 140 is configured to reflect light of one or more specific wavelengths and transmit light of other wavelengths. For instance, the wavelength-selective transflective member 140 may be configured to reflect light of the wavelength(s) corresponding to blue light (e.g., about 450 nm to about 495 nm) and transmit light of other wavelengths.

The backlight unit 200 is disposed at an opposite direction to a direction in which light radiating from the display panel 100 is configured to travel. The backlight unit 200 includes a light guide plate 210, a light source unit 220 including a plurality of light sources 221, an optical member 230, and a reflective sheet 240.

The light guide plate 210 is disposed under the display panel 100 and is configured to guide light radiating from the light source unit 220 towards the display panel 100. Particularly, the light guide plate 210 is overlapped with at least the display area 160 of the display panel 100. The light guide plate 210 includes an exit surface from which light radiates, a lower surface facing the exit surface, and a plurality of side surfaces connecting the exit surface and the lower surface. At least one of the side surfaces faces the light source unit 220, and thereby, is configured to serve as a light incident surface into which light emitted from the light source unit 220 is incident. A side surface facing the light incident surface is configured to serve as a light reflective surface to reflect light.

The light source unit 220 includes a printed circuit board 222 and the light sources 221, e.g., light emitting diodes, disposed on the printed circuit board 222. In addition, the light sources 221 are configured to emit the same color of light or different colors of light. For example, all the light sources 221 may emit light of the same color, e.g., yellow light.

In addition, the light source unit 220 is disposed (e.g., spatially positioned) to emit light while facing at least one side surface of the side surfaces of the light guide plate 210. In this manner, the light source unit 220 is configured to radiate light towards the display panel 100 via the light guide plate 210.

The optical member 230 is disposed between the light guide plate 210 and the display panel 100. The optical member 230 is configured to control light radiating from the light is guide plate 210, which is transmitted to the optical member 230 from the light source unit 220. In addition, the optical member 230 includes a diffusion sheet 236, a prism sheet 234, and a protective sheet 232, which are sequentially stacked one on another.

The diffusion sheet 236 is configured to diffuse light radiating from the light guide plate 210. The prism sheet 234 is configured to condense the light diffused by the diffusion sheet 236 to enable the light to travel in a direction substantially vertical (or perpendicular) to the display panel 100. The light radiating from the prism sheet 234 is vertically (or substantially vertically) incident on the display panel 100. The protective sheet 232 is disposed on the prism sheet 234 and is configured to protect the prism sheet 234 from external impacts and/or environmental contaminants.

According to exemplary embodiments, the optical member 230 includes one diffusion sheet 236, one prism sheet 234, and one protective sheet 232, but it is contemplated that any suitable number of diffusion sheets 236, prism sheets 234, and protective sheets 232 may be utilized. That is, at least one of the diffusion sheet 236, the prism sheet 234, and the protective sheet 232 of the optical member 230 may be provided in plural number, or one of the diffusion sheet 236, the prism sheet 234, and the protective sheet 232 may be omitted from the optical member 230.

The reflective sheet 240 is disposed under the light guide plate 210 and is configured to reflect light leaked from the light guide plate 210 that is not initially directed towards the display panel 100, and thereby, configured to change a path of such light leaked from the light guide plate 210 to be directed towards the display panel 100. The reflective sheet 240 includes one or more light reflective materials configured to reflect light. The reflective sheet 240 is disposed on the lower cover 320 and is configured to reflect light radiating from the is light source unit 220 in at least one direction directed away (or substantially away) from the display panel 100. As a result, the reflective sheet 240 is configured to increase an amount of light provided to the display panel 100.

According to exemplary embodiments, the light source unit 220 is disposed (e.g., spatially positioned) to radiate light toward the side surface of the light guide plate 210, but it is contemplated that light source unit 220 may radiate light in one or more other directions and/or surfaces of the light guide plate 210. That is, the light source unit 220 may be disposed to radiate light toward a lower surface of the light guide plate 210. If the light guide plate 210 is to be omitted from the backlight unit 200, the light source unit 220 may be disposed under the display panel 100, and thus, light radiating from the light source unit 220 may be directly provided to the display panel 100.

The upper cover 310 is disposed on the display panel 100 and may be geometrically configured in correspondence with the geometric configuration of the display panel 100. The upper cover 310 includes an upper surface 312 provided with a display window 311 formed through the upper cover 310, and thereby, configured to expose the display area 160 of the display panel 100. The upper cover 310 is configured to support a front edge of the display panel 100. It is also noted that the upper cover 310 includes an upper cover side surface 314 bent downward from the upper surface 312. As seen in FIG. 1, since the display panel 100 has the rectangular plate shape, the upper cover side surface 314 is configured to include four side surfaces; however, it is contemplated that the number of side surfaces may be in correspondence with the geometric configuration of the upper cover 310. The upper cover 310 is coupled to the lower cover 320 to support the front edge of the display panel 100.

Accordingly, the lower cover 320 is disposed under the backlight unit 200. The is lower cover 320 includes a bottom surface 322 geometrically configured in correspondence with the geometric configured of the display panel 100 and the backlight unit 200, as well as includes a lower cover side surface 324 bent upward from the bottom surface 322. As seen in FIG. 1, since the display panel 100 and the backlight unit 200 have the rectangular shape, the lower cover side surface 324 is configured to include four side surfaces; however, it is contemplated that the number of side surfaces may be in correspondence with the geometric configuration of the upper cover 310. The lower cover 320 is configured to provide a "space" to accommodate the display panel 100 and the backlight unit 200 therein. This space or cavity region may be defined by the bottom surface 322 and the lower cover side surfaces 324. In addition, the lower cover 320 is coupled to the upper cover 310 to accommodate and hold the display panel 100 and the backlight unit 200 therein.

Figure 3:
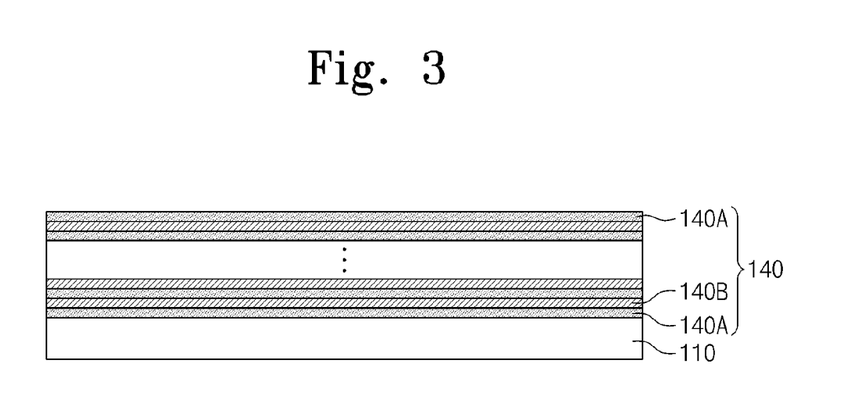
FIG. 3 is a cross-sectional view of an array substrate including a wavelength-selective transflective member of FIG. 2, according to exemplary embodiments.
Figure 4:
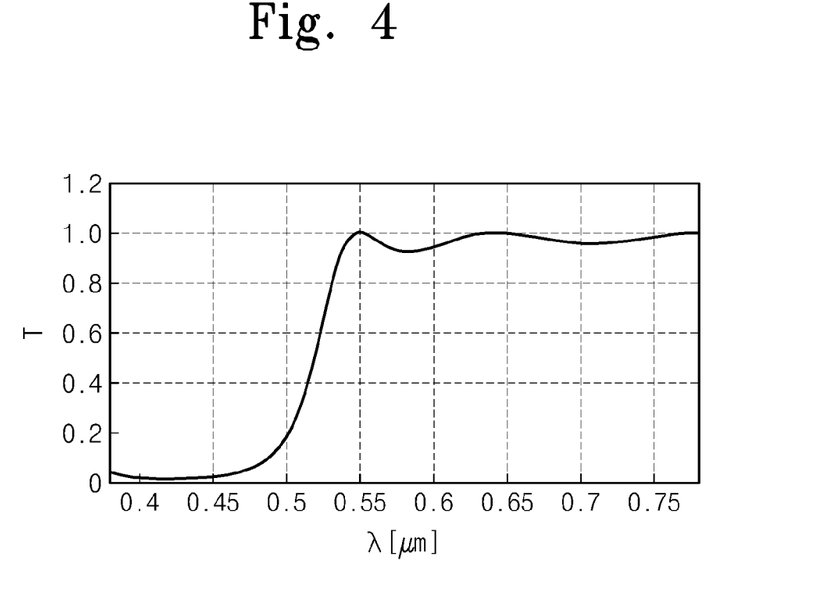
FIG. 4 is a graph showing a spectrum of light propagating through the wavelength-selective transflective member, according to exemplary embodiments.

FIG. 3 is a cross-sectional view of an array substrate including the wavelength-selective transflective member of FIG. 2, according to exemplary embodiments. FIG. 4 is a graph showing a spectrum of light propagating through the wavelength-selective transflective member, according to exemplary embodiments.

Referring to FIGS. 3 and 4, the wavelength-selective transflective member 140 includes a plurality of layers having different refractive indices from each other or from at least one other of the plurality of layers. For instance, the wavelength-selective transflective member 140 includes first layers 140A configured to transmit light therethrough and second layers 140B having a different refractive index from that of the first layers 140A. In exemplary embodiments, the first layers 140A are alternately arranged with the second layers 140B.

The first layers 140A and the second layers 140B have refractive indices from about 1.3 to about 2.4, e.g., about 1.7 to about 2.0. A difference in the refractive indices of the is first layers 140A and the second layers 140B is equal to or greater than about 0.1. For instance, the first layers 140A may include metal oxide having the refractive index of about 2.35, e.g., $TiO_2$, whereas the second layers 140B may include silicon oxide having the refractive index of about 1.45, e.g., $SiO_2$. According to exemplary embodiments, the first layers 140A may have the same thickness, and the second layers 140B may have different thicknesses from each other.

The wavelength-selective transflective member 140 is configured to reflect light having one or more predetermined wavelengths and transmit light having other wavelengths. For instance, when the wavelength-selective transflective member 140 has a configuration shown in Table 1, the wavelength-selective transflective member 140 may be configured to reflect light having the wavelength from about 420 nm to about 470 nm.

TABLE 1

| Order | Material | Refractive Index | Thickness (nm) |
|---|---|---|---|
| 1 | $TiO_2$ | 2.35 | 44.6 |
| 2 | $SiO_2$ | 1.45 | 54.2 |
| 3 | $TiO_2$ | 2.35 | 44.6 |
| 4 | $SiO_2$ | 1.45 | 88.5 |
| 5 | $TiO_2$ | 2.35 | 44.6 |
| 6 | $SiO_2$ | 1.45 | 63.9 |
| 7 | $TiO_2$ | 2.35 | 44.6 |
| 8 | $SiO_2$ | 1.45 | 88.5 |
| 9 | $TiO_2$ | 2.35 | 44.6 |
| 10 | $SiO_2$ | 1.45 | 54.2 |
| 11 | $TiO_2$ | 2.35 | 44.6 |

In Table 1, the order indicates the stack order of the layers of the wavelength-selective transflective member 140 on the array substrate 110. In this manner, the layer corresponding to Order 1 may be disposed closest to the array substrate 110. That is, if the wavelength-selective transflective member 140 includes eleven layers configured to include the first layers 140A and the second layers 140B, the wavelength-selective transflective member 140 may be configured to reflect light having the blue wavelength and transmit light having other wavelengths.

Figure 5:
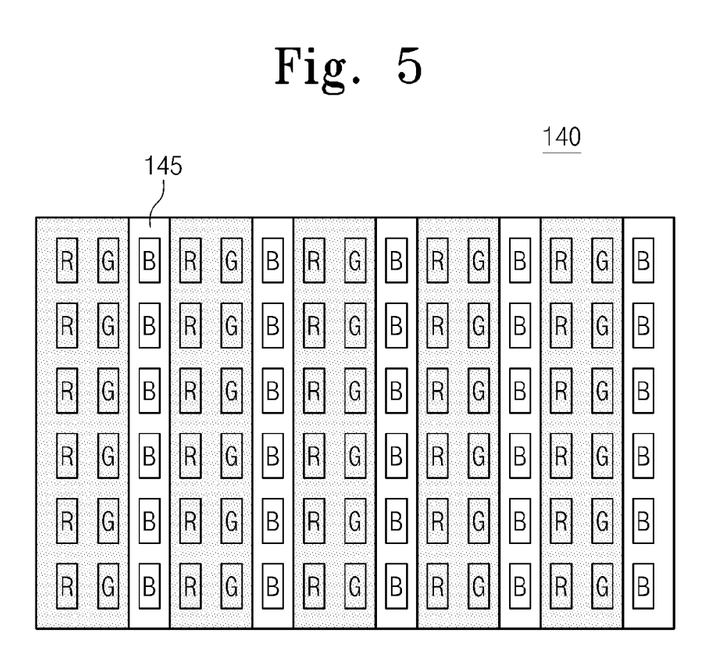
FIG. 5 is a plan view of an arrangement of color filters and a shape of the wavelength-selective transflective member of the display panel of FIG. 1, according to exemplary embodiments.
Figure 6:
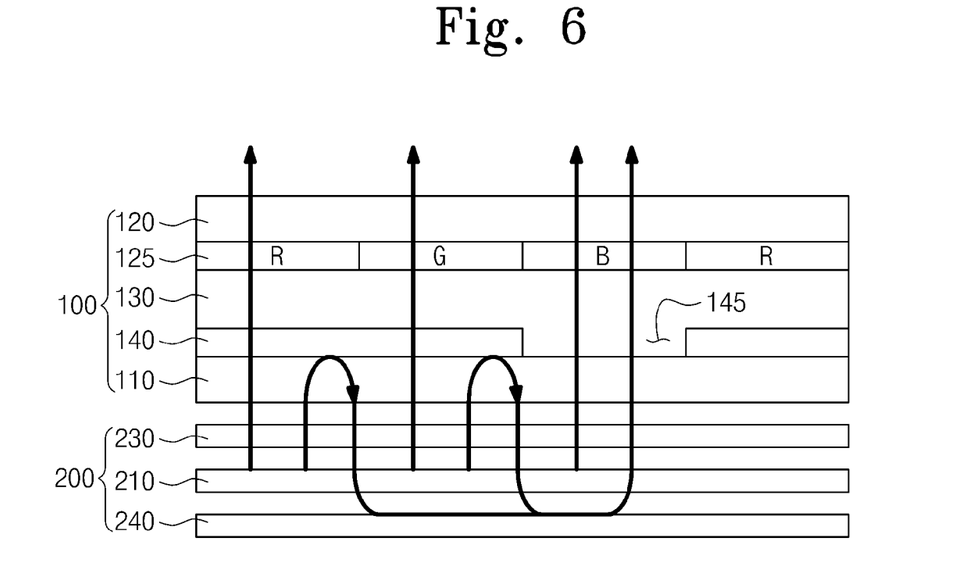
FIG. 6 is a partial cross-sectional view of the display device of FIG. 1 illustrating operation of the display device, according to exemplary embodiments.

FIG. 5 is a plan view of an arrangement of color filters and a shape of the wavelength-selective transflective member of the display panel of FIG. 1, according to exemplary embodiments. FIG. 6 is a partial cross-sectional view of the display device of FIG. 1 illustrating operation of the display device.

Referring to FIGS. 5 and 6, among the color filters R, G, and B disposed on the opposite substrate 120 of the display panel 100, the color filters having the same color may be arranged in the same column. That is, the color filters R, G, and B are sequentially arranged in a first direction substantially in parallel to the long side of the display panel 100, and the color filters having the same color are arranged in a second direction substantially in parallel to the short side of the display panel 100.

The wavelength-selective transflective member 140 includes an opening (or aperture) 145 formed therethrough.

The opening 145 corresponds to any one of the color filters R, G, and B that is configured to transmit light reflected by the wavelength-selective transflective member 140. In addition, the wavelength-selective transflective member 140 is configured to is reflect the light having the same color as the color of the color filter corresponding to the opening 145. For instance, the wavelength-selective transflective member 140 is configured to reflect the blue light and the opening 145 corresponds to the blue color filter B of the wavelength-selective transflective member 140. Accordingly, the opening 145 may have a stripe shape corresponding to the arrangement of the blue color filter B.

An operation of the display device employing the wavelength-selective transflective member 140 will be described in more detail in accordance with FIG. 6.

According to exemplary embodiments, light is radiated toward the display panel 100 from backlight unit 200 via the light guide plate 210.

The wavelength-selective transflective member 140 is configured to reflect the blue light, and as such, other wavelengths of light incident on the wavelength-selective transflective member 140 may be transmitted through the wavelength-selective transflective member 140 except for the blue light. The light propagating through the wavelength-selective transflective member 140 may be transmitted through the red color filter R and the green color filter G, and thereby, perceived by an observer as red and green lights, respectively.

The blue light reflected by the wavelength-selective transflective member 140 may propagate through the opening 145. For instance, the blue light is reflected by the wavelength-selective transflective member 140 in the areas respectively corresponding to the red color filter R and the green color filter G. The reflected blue light is incident on the reflective sheet 240 and reflected by the reflective sheet 240. In this manner, the blue light is propagated through the blue color filter B to be incident on the blue color filter B.

In addition, the light traveling to the opening 145 among the light provided to the wavelength-selective transflective member 140 from the backlight unit 200 is provided to the is blue color filter B after propagating through the opening 145.

Accordingly, the amount of blue light provided to the blue color filter B is larger than that of the blue light provided to the blue color filter B when the wavelength-selective transflective member 140 does not exist.

Therefore, the amount of the blue light provided to the blue color filter B is increased in the display device 100 employing the wavelength-selective transflective member 140. As such, an observer may perceive the image in which the brightness of the blue light and the display quality thereof are improved.

Hereinafter, a display device will be described with reference to FIGS. 7-11. In FIGS. 7-11, the same reference numerals denote the same elements as in FIGS. 1-6, and thus, detailed descriptions of the same elements will be omitted to avoid obscuring exemplary embodiments described herein.

Figure 7:
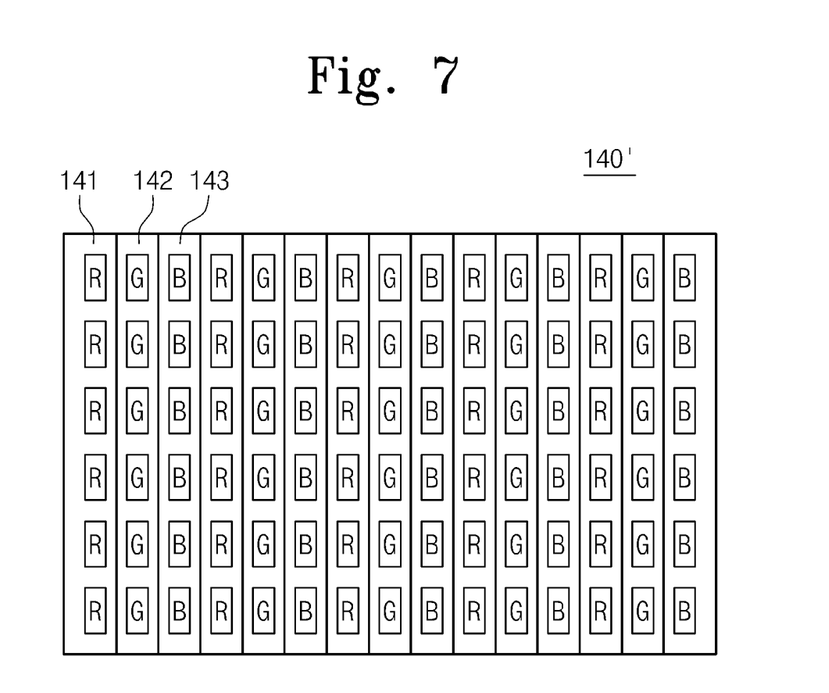
FIG. 7 is a plan view of an arrangement of color filters and a shape of the wavelength-selective transflective member, according to exemplary embodiments.
Figure 8:
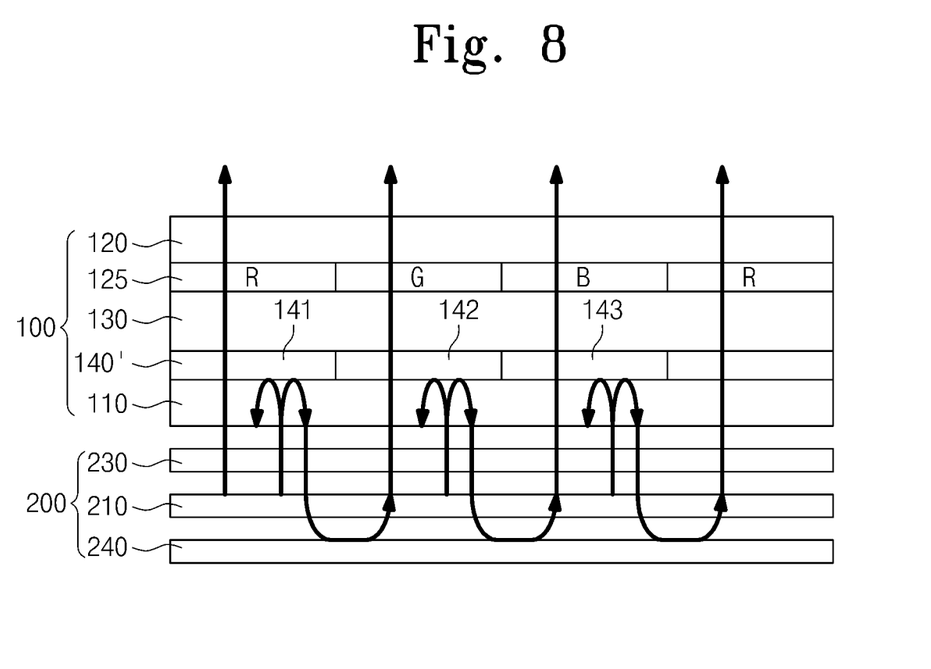
FIG. 8 is a partial cross-sectional view of the display device of FIG. 7 illustrating operation of the display device, according to exemplary embodiments.
Figure 9:
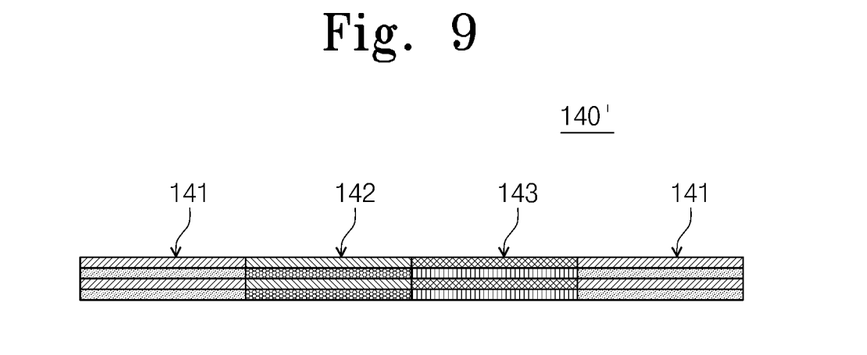
FIGS. 9 and 10 are cross-sectional views of the wavelength-selective transflective member of FIGS. 7 and 8, according to exemplary embodiments.
Figure 10:
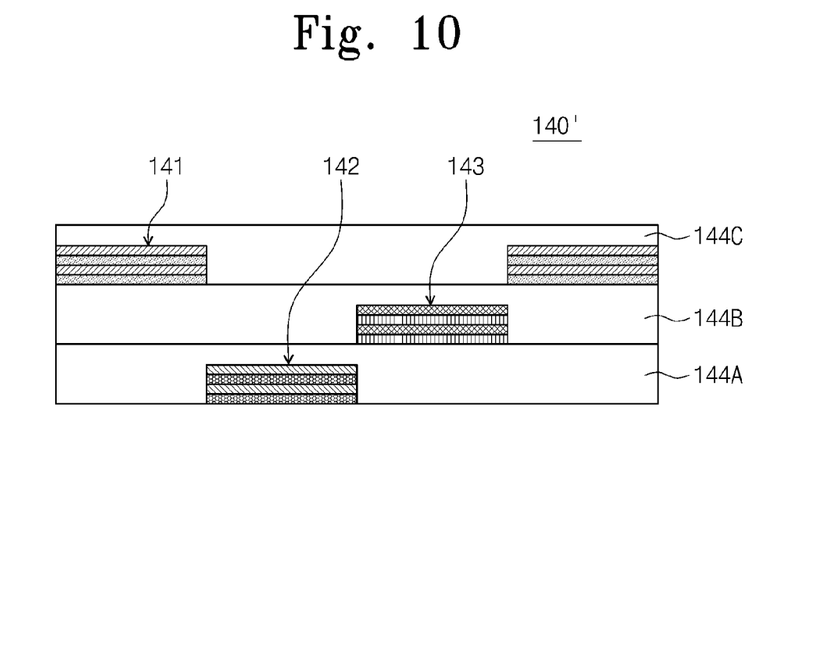

FIG. 7 is a plan view of an arrangement of color filters and a shape of the wavelength-selective transflective member, according to exemplary embodiments. FIG. 8 is a partial cross-sectional view of the display device of FIG. 7 illustrating operation of the display device, according to exemplary embodiments. FIGS. 9 and 10 are cross-sectional views of the wavelength-selective transflective member of FIGS. 7 and 8.

Referring to FIGS. 7-10, the display device 100 includes a wavelength-selective transflective member 140'.

The wavelength-selective transflective member 140' includes a plurality of sub-wavelength-selective transflective members 141, 142, and 143, which are disposed on the array substrate 110 and configured to transmit light having different wavelengths. For instance, the wavelength-selective transflective member 140' includes a first sub-wavelength-selective transflective member 141 corresponding to the red color filter R and configured to transmit the red light, a second sub-wavelength-selective transflective member 142 corresponding to the green color filter G and configured to transmit the green light, and a third sub-wavelength-selective transflective member 143 corresponding to the blue color filter B and configured to transmit the blue light.

The first sub-wavelength-selective transflective member 141 is configured to transmit the red light and reflect other light except for the red light. The second sub-wavelength-selective transflective member 142 is configured to transmit the green light and reflect other light except for the green light. The third sub-wavelength-selective transflective member 143 is configured to transmit the blue light and reflect other light except for the blue light.

According to exemplary embodiments, the wavelength-selective transflective member 140' may have the configuration that the first, second, and third sub-wavelength selective transflective members 141, 142, and 143 are disposed on the same layer as shown in FIG. 9.

In addition, the wavelength selective transflective member 140' may have the configuration that the first, second, and third sub-wavelength-selective transflective members 141, 142, and 143 are disposed on one or more different layers. For instance, the second sub-wavelength selective transflective member 142 is disposed to correspond to the green color filter G and a first protective layer 144A is configured to cover the second sub-wavelength selective transflective member 142. The third sub-wavelength selective transflective member 143 is disposed on the first protective layer 144A to correspond to the blue color filter B and a second protective layer 144B is configured to cover the third sub-wavelength selective transflective member 143. The first sub-wavelength selective transflective member 141 is disposed on the is second protective layer 144B to correspond to the red color filter R and a third protective layer 144C is configured to cover the first sub-wavelength selective transflective member 141. It is noted that the protective layers 144A, 144B, and 144C may be or include one or more organic and/or inorganic materials that are configured to transmit light.

An operation of the display device including the wavelength-selective transflective member 140' will be described in more detail in association with FIG. 8.

According to exemplary embodiments, light is radiated toward the display panel 100 from the backlight unit 200 via the light guide plate 210.

The first sub-wavelength selective transflective member 141 is configured to transmit the red light and reflect the other light except for the red light. As such, the red light propagates through the red color filter R and is emitted toward an observer after propagating through the first sub-wavelength selective transflective member 141. The lights reflected by the first sub-wavelength selective transflective member 141 are made incident upon the reflective sheet 240 and reflected by the reflective sheet 240 of the backlight unit 200 toward the wavelength-selective transflective member 140'. The lights reflected by the reflective sheet 240 propagate through the second and third sub-wavelength selective transflective members 142 and 143 and are made incident upon the green and blue color filters G and B. The lights respectively provided to the green and blue color filter G and B transmit through the green and blue color filters G and B, and thus, the green light and the blue light are radiated toward the observer.

The second sub-wavelength selective transflective member 142 is configured to transmit the green light and reflect the other light except for the green light. The green light propagates through the green color filter G and is radiated toward the observer after propagating through the second sub-wavelength selective transflective member 142. In addition, the lights is reflected by the second sub-wavelength selective transflective member 142 are made incident on the reflective sheet 240 and reflected by the reflective sheet 240 of the backlight unit 200 toward the wavelength-selective transflective member 140'. The lights reflected by the reflective sheet 240 propagate through the first and third sub-wavelength selective transflective members 141 and 143 and are made incident on the red and blue color filters R and B. The lights respectively made incident on the red and blue color filter R and B are transmitted through the red and blue color filters R and B, and thus, the red light and the blue light are radiated toward the observer.

The third sub-wavelength selective transflective member 143 is configured to transmit the blue light and reflect the other lights except for the blue light. The blue light propagates through the blue color filter B and is radiated toward the observer after propagating through the third sub-wavelength selective transflective member 143. In addition, the lights reflected by the third sub-wavelength selective transflective member 143 are made incident upon the reflective sheet 240 and reflected by the reflective sheet 240 of the backlight unit 200 toward the wavelength-selective transflective member 140'. The lights reflected by the reflective sheet 240 propagate through the first and second sub-wavelength selective transflective members 141 and 142 and are made incident on the red and green color filters R and G. The lights respectively provided to the red and green color filter R and G transmit through the red and green color filters R and G, and thus, the red light and the green light are radiated toward the observer.

Accordingly, the amount of the red, green, and blue lights provided to the red, green, and blue color filters R, G, and B is larger than that of the red, green, and blue lights provided to the red, green, and blue color filters R, G, and B when the wavelength-selective transflective member 140' does not exist. Therefore, the amount of the red, green, and blue lights provided to the red, green, and blue color filters R, G, and B is increased in the display is device employing the wavelength-selective transflective member 140', and the observer may perceive the image in which the brightness of the red, green, and blue lights and the display quality thereof are improved.

Figure 11:
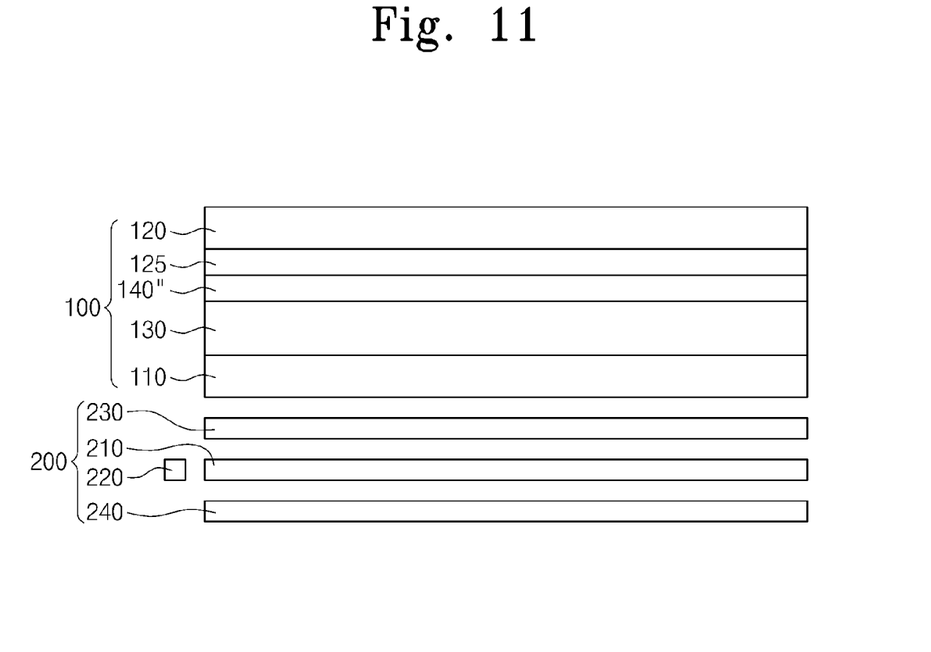
FIG. 11 is a cross-sectional view of a display panel and a backlight unit, according to exemplary embodiments.

FIG. 11 is a cross-sectional view of a display panel and a backlight unit, according to exemplary embodiments.

Referring to FIG. 11, a display device includes a display panel 100 and a backlight unit 200.

The display panel 100 includes an array substrate 110, an opposite substrate 120 facing the array substrate 110, and a liquid crystal layer 130 interposed between the array substrate 110 and the opposite substrate 120.

The array substrate 110 includes a plurality of pixels (not shown) arranged in, for example, a matrix form (or configuration). For instance, the plurality of pixels may be uniformly positioned and, thereby, spaced in one or more row and column formations. It is contemplated, however, that the spatial positioning and/or spacing between pixels may be varied or randomly disposed. While not illustrated, each pixel includes a plurality of sub-pixels having different colors from each other. In addition, each pixel includes (or is electrically connected to) a gate line (not shown), a data line (not shown) insulated from the gate line and crossing the gate line, and a pixel electrode (not shown). Further, each pixel includes a thin film transistor (not shown) electrically connected to the gate line, the data line, and the pixel electrode. The thin film transistor is configured to switch a driving signal applied to the pixel electrode.

The opposite substrate 120 includes a color filter layer 125 that realizes a predetermined color using the light provided from the backlight unit 200.

A wavelength-selective transflective member 140" is disposed on a surface of the is color filter layer 125, which faces the array substrate 110. The wavelength-selective transflective member 140" is configured to reflect light of one or more specific wavelengths, which are incident thereon from the backlight unit 200, and transmit light of other wavelengths. In this manner, it is to be appreciated that the wavelength-selective transflective member 140" may be disposed on the opposite substrate above the liquid crystal layer 130 versus the configuration described in association with FIG. 2.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A display device, comprising:
   a display panel configured to display an image; and
   a backlight unit configured to provide light to the display panel,
   wherein the display panel comprises:
   an array substrate comprising a plurality of pixel areas;
   an opposite substrate facing the array substrate;
   a color filter layer disposed on the opposite substrate, the color filter layer comprising a plurality of color filters;
   a liquid crystal layer disposed between the array substrate and the opposite substrate; and
   a wavelength-selective transflective member disposed on the array substrate or the opposite substrate, the wavelength-selective transflective member overlapping, in a plan view, at least two of the plurality of color filters and comprising an opening overlapping, in the plan view, at least one of the plurality of color filters.

2. The display device of claim 1, wherein the plurality of color filters comprise a plurality of colors.

3. The display device of claim 2, wherein the wavelength-selective transflective member is configured to reflect light of one or more wavelengths corresponding to the color of the color filter corresponding to the opening.

4. The display device of claim 3, wherein:
   a first plurality of the plurality of color filters comprising different colors is sequentially arranged in a first direction; and
   a second plurality of the plurality of color filters comprising the same color is arranged in a second direction substantially perpendicular to the first direction.

5. The display device of claim 4, wherein the opening is stripe shaped.

6. The display device of claim 1, wherein the wavelength-selective transflective member comprises:
a plurality of first layers configured to transmit light; and
a plurality of second layers comprising a refractive index different from a refractive index of the plurality of first layers, and
wherein the plurality of first layers are alternately arranged with the plurality of second layers.

7. The display device of claim 6, wherein:
the plurality of first layers and the plurality of second layers comprise a refractive index from about 1.3 to about 2.4; and
a difference in the refractive index between the plurality of first layers and the plurality of second layers is equal to or greater than about 0.1.

8. The display device of claim 6, wherein the plurality of first layers comprises a metal oxide material configured to transmit light.

9. The display device of claim 6, wherein the plurality of second layers comprises a silicon oxide material configured to transmit light.

10. The display device of claim 1, wherein the wavelength-selective transflective member is disposed between the array substrate and the liquid crystal layer.

11. The display device of claim 1, wherein the wavelength-selective transflective member is disposed between the opposite substrate and the liquid crystal layer.

12. A display device, comprising:
a display panel configured to display an image; and
a backlight unit configured to provide light to the display panel,
wherein the display panel comprises:
an array substrate comprising a plurality of pixel areas;
an opposite substrate facing the array substrate;
a color filter layer comprising a plurality of color filters;
a liquid crystal layer disposed between the array substrate and the opposite substrate; and
a wavelength-selective transflective member comprising a plurality of sub-wavelength selective transflective members, the wavelength-selective transflective member being disposed on the array substrate or the opposite substrate and being configured to transmit light of different wavelengths,
wherein the wavelength-selective transflective member is disposed between the array substrate and the liquid crystal layer, and
wherein the array substrate is disposed between the backlight unit and the liquid crystal layer.

13. The display device of claim 12, wherein the plurality of sub-wavelength selective transflective members comprise:
a first sub-wavelength selective transflective member;
a second sub-wavelength selective transflective member; and
a third sub-wavelength selective transflective member.

14. The display device of claim 13, wherein:
the first sub-wavelength selective transflective member is disposed in association with a first one of the plurality of color filters and is configured to transmit light of a first wavelength;
the second sub-wavelength selective transflective member is disposed in association with a second one of the plurality of color filters and is configured to transmit light of a second wavelength; and
the third sub-wavelength selective transflective member is disposed in association with a third one of the plurality of color filters and is configured to transmit light of a third wavelength.

15. The display device of claim 14, wherein the first, second, and third sub-wavelength selective transflective members are disposed on the same layer.

16. The display device of claim 14, wherein the first, second, and third sub-wavelength selective transflective members are disposed on different layers.

17. The display device of claim 16, wherein the wavelength-selective transflective member further comprises:
a first protective layer covering the first sub-wavelength selective transflective member;
a second protective layer disposed on the first protective layer, the second protective layer covering the second sub-wavelength selective transflective member; and
a third protective layer disposed on the second protective layer, the third protective layer covering the third sub-wavelength selective transflective member.

18. The display device of claim 17, wherein the first, second, and third protective layers comprise an organic material or an inorganic material configured to transmit light.

19. The display device of claim 12, wherein the wavelength-selective transflective member is disposed between the opposite substrate and the liquid crystal layer.

20. The display device of claim 12, wherein the wavelength-selective transflective member comprises an aperture overlapping a first color filter of the plurality of color filters.

* * * * *